Dec. 4, 1928.

E. H. FAHRNEY 1,693,645

COMBINED REVERSE AND REDUCTION GEAR

Filed Feb. 7, 1927  3 Sheets-Sheet 1

Inventor,
EMERY H. FAHRNEY
By G. R. Gehrands
Atty.

Dec. 4, 1928.
E. H. FAHRNEY
1,693,645
COMBINED REVERSE AND REDUCTION GEAR
Filed Feb. 7, 1927
3 Sheets-Sheet 2
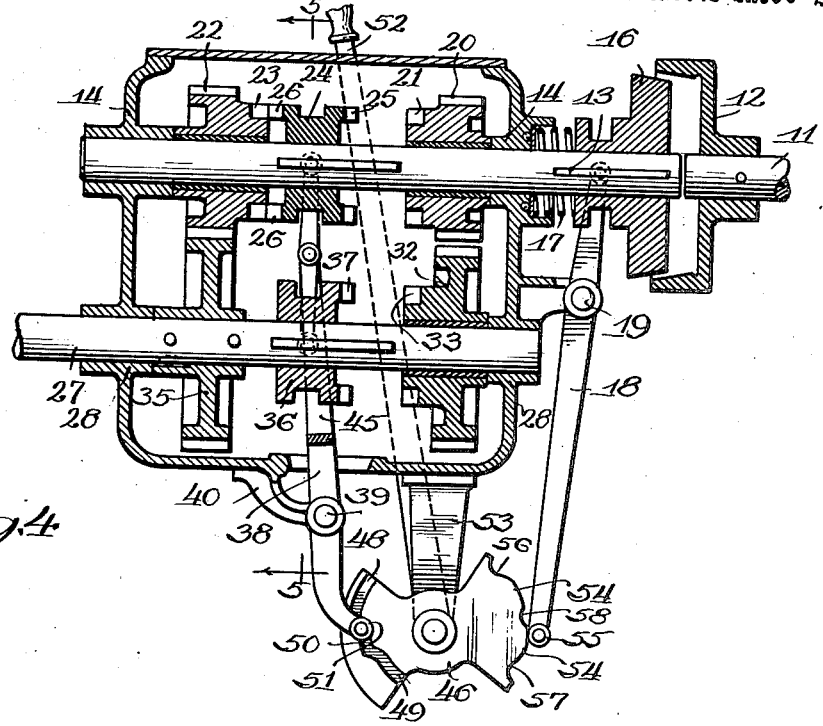
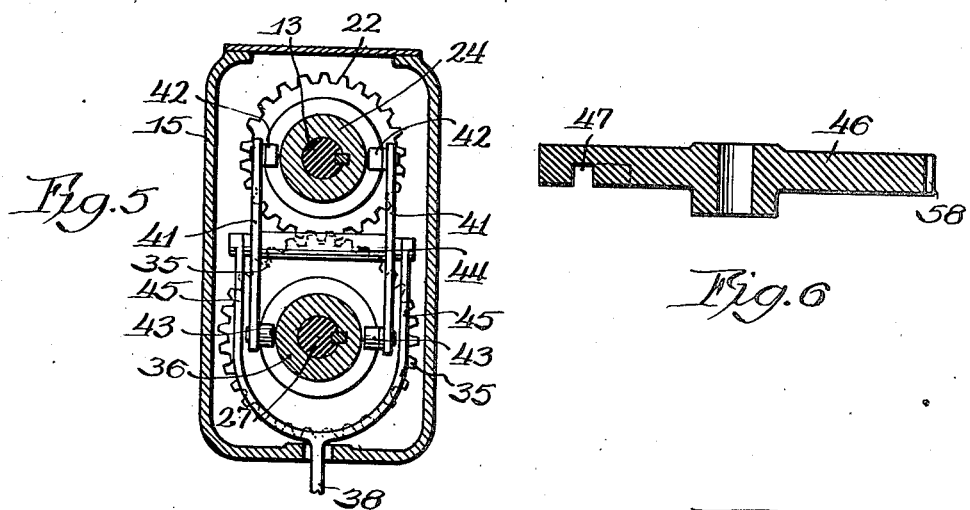
Inventor,
EMERY H. FAHRNEY
By
Atty Dec. 4, 1928.
E. H. FAHRNEY
1,693,645
COMBINED REVERSE AND REDUCTION GEAR
Filed Feb. 7, 1927    3 Sheets-Sheet 3
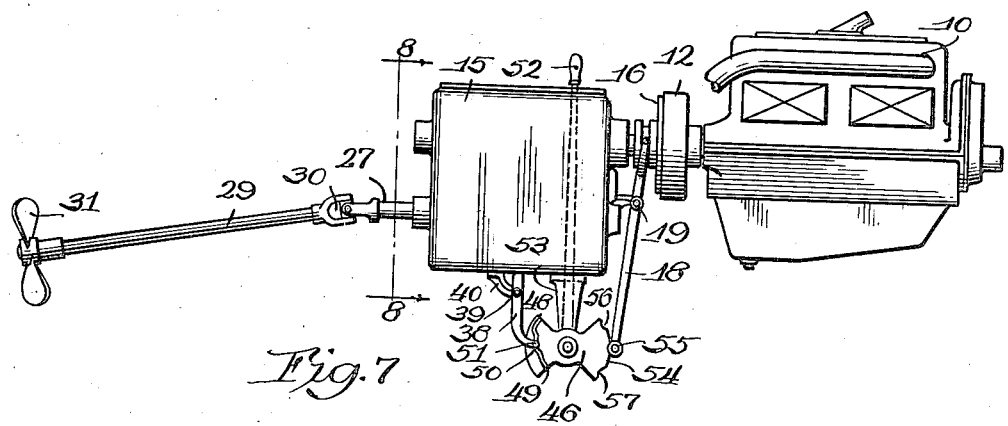
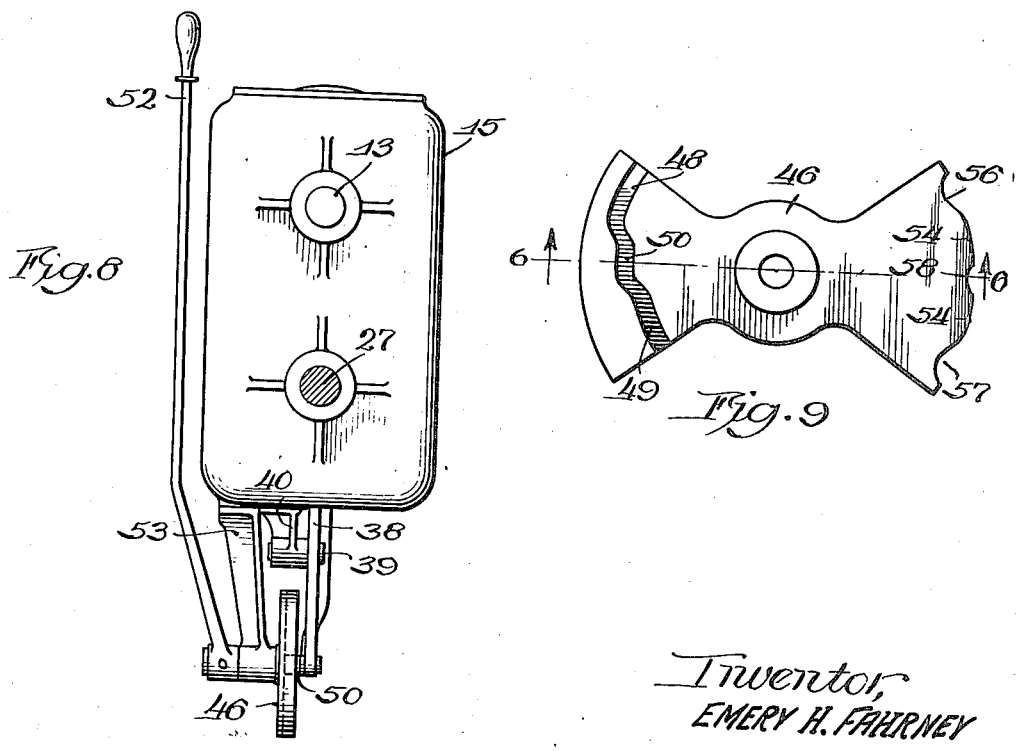
Inventor,
EMERY H. FAHRNEY
By G.R.Gehmandt
Atty Patented Dec. 4, 1928.

1,693,645

UNITED STATES PATENT OFFICE.

EMERY H. FAHRNEY, OF CHICAGO, ILLINOIS.

COMBINED REVERSE AND REDUCTION GEAR.

Application filed February 7, 1927. Serial No. 166,295.

This invention relates to improvements in a combined reverse and reduction gear, particularly adapted though not necessarily limited in its use with marine engines, and one of the objects of the invention is to provide an improved gear of this character in which the friction clutch of the engine and the reversing gear will be controlled and shifted by means of a single operating lever, the clutches for the respective gears being rendered active in advance of the friction clutch of the engine.

A further object is to provide an improved marine reversing gear of this character which is provided with a plurality of clutches which are adapted to be controlled by a single cam element, which cam element operates through the medium of clutches for rendering the respective gears active and inactive.

A further object is to provide an improved gear of this character which will be comparatively simple and compact in construction and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a view partly in vertical section and partly in elevation of a gearing constructed in accordance with the principles of this invention and showing the parts in a neutral position.

Figure 4 is an enlarged detail view similar to Figure 1, with the parts in another position.

Figure 5 is a sectional view taken on line 5—5, Figure 4.

Figure 6 is an enlarged detail sectional view taken on line 6—6, Figure 9.

Figure 7 is a view in side elevation of a portion of an engine having a gearing of this character constructed in accordance with the principles of this invention, applied thereto.

Figure 8 is a view taken on line 8—8, Figure 7.

Figure 9 is an enlarged detailed elevation of the cam device.

Figure 1:
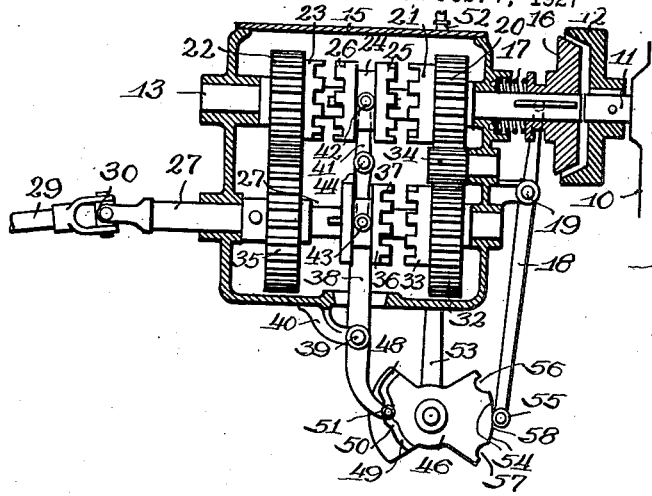

Referring more particularly to the drawings the numeral 10 designates an engine having a driving shaft 11 to which is connected an ordinary friction clutch member 12.

A shaft 13 is journaled in suitable bearings 14 in the walls of a casing 15, and this shaft 13 is arranged in alinement with the shaft 11.

Keyed to the shaft 13 is a friction clutch member 16, which co-operates with the clutch member 12 for frictionally locking the shafts 11 and 13 together.

The clutch member 16 is normally moved in a direction toward the clutch member 12 by means of a suitable spring 17, and the clutch member 16 is moved against the stress of the spring 17 and out of operative contact with the clutch member 12 by means of a lever 18 pivotally supported as at 19 intermediate its ends, one end of the lever being connected with the clutch member 16.

Loosely mounted upon the shaft 13 is a gear 20 which is held against longitudinal movement on the shaft 13 in any suitable manner.

The gear 20 is provided with a clutch face 21 and another gear 22 is loosely mounted upon the shaft 13 and is provided with a clutch face 23.

The gears 20 and 22 and the respective clutch faces 21 and 23 are spaced from each other longitudinally of the shaft 13. Intermediate these gears and keyed to the shaft 13 for longitudinal movement thereupon is a clutch member 24 having a clutch face 25 adapted to co-operate with the clutch face 21 of the gear 20, and a clutch face 26 adapted to co-operate with the clutch face 23 of the gear 22.

A shaft 27 is also journaled in suitable bearings 28 in the walls of the casing 15 and is arranged parallel with the shaft 13. To the end of the shaft 27 is connected a propeller shaft 29, preferably through the medium of a universal joint 30, and this shaft carries a propeller 31. Loosely mounted upon the shaft 27 and in alinement with the gear 20, is a gear 32 which is provided with a clutch face 33. Intermediate the gears 20 and 32 is a gear 34 which meshes with both of the gears 20 and 32.

Secured to the shaft 27 for rotation therewith is a gear 35 which meshes with a gear 22, and this gear 35 is spaced from the gear 32 in a direction lengthwise of the shaft 27.

A clutch member 36 is keyed to the shaft 27 between the gears 35 and 32, and the clutch member 36 is provided with a clutch face 37 adapted to co-operate with the clutch face 33 of the gear 32 for locking the gear 32 for rotation with the shaft 27.

The clutch members 24 and 36 are adapted to be shifted upon their respective shafts and into and out of engagement with the clutch members of the respective gears, by means of a lever 38, which is pivotally supported intermediate its ends 39 preferably by means of a bracket 40.

Links 41 are preferably provided with anti-friction rollers 42—43 which project into and operate within peripheral grooves in the respective clutch members 24—36. These links 41 are connected by means of a rod 44 to the ends of which rod are pivotally connected the extremities of a yoke 45 formed on the end of the lever 38 so that when the lever 38 is rocked about its pivot 39, both of the clutch members 24 and 36 will be simultaneously shifted upon their respective shafts 13 and 27 and in the same direction so as to lock or unlock predetermined ones of the gears with relation to their respective shafts.

The lever 38 is adapted to be rocked about its pivot by means of a cam element 46 which is provided with a groove 47 opening through one face thereof, as indicated in Figure 6. A portion of the groove 47 adjacent one end thereof is formed on a radius described from the center of the axis of the cam element 46 as at 48, while another portion 49 of the groove adjacent the other end thereof is described on the radius described from the center of the axis of the cam element 46, and which radius is shorter than the radius of the portion 48 of the groove.

Intermediate these portions 48 and 49, the groove is formed on another radius which is concentric with the axis of the cam element 46, as at 50, and which radius is of a length somewhat greater than the length of the radius on which the portion 49 of the groove is shaped, but less than the radius on which the portion 48 of the groove is shaped.

Carried by the free end of the lever 38 is an anti-friction roller 51 which operates in the groove 47 and the cam element is adapted to be oscillated about its axis by means of a lever 52 connected thereto, and which is arranged in a convenient position for the operator.

The cam element 46 is preferably pivotally mounted upon a bracket 53.

The groove 47 is arranged preferably adjacent one end of the cam element 46 and the other extremity or edge 54 of the cam element is shaped to form an operating surface against which an anti-friction roller 55 carried by the free end of the lever 18, operates.

The edge or surface 54 of the cam is provided adjacent its extremities with recesses 56 and 57, adapted to receive the roller 55, the roller being moved into these recesses, when they are in alinement with the roller, by means of the spring 17 which controls the clutch member 16.

When the roller 55 is moving over the surface 54 the clutch member 16 will be shifted against the stress of the spring 17, so that the friction clutch will be rendered inactive, but when the roller enters one or the other of the recesses 56—57, the spring 17 will also move the clutch member 16 into frictional locking engagement with the clutch 12 to frictionally lock the shafts 11 and 13 for rotation together.

If desired a recess 58 may be provided in the surface 54 of the cam element intermediate the recesses 56 and 57, and which recess 58 is of a depth considerably less than the depth of the recesses 56—57, but is not sufficiently deep so as to permit the clutch members 16 and 12 to become frictionally locked.

This recess 58 serves as a means for indicating the neutral position of the clutch members and may also serve as a means for allowing a slipping action between the clutch members 12 and 16, while the other clutch members are locking the respective gears to the shafts.

It is thought that the operation of this mechanism will be clearly understood from the foregoing, but briefly stated it is as follows.

Assuming the parts to be in the position shown in Figure 1, which is the neutral position, the roller 51 on the lever 38 will be in the concentric portion 50 of the groove 47 and the clutch members 24 and 36 will be in inactive positions with respect to the co-operating gears, which will cause the gears 20, 22 and 32 to be unlocked with relation to their respective shafts 13 and 27, while the gear 35 will be locked for rotation with the shaft 27. At the same time the clutch members 16 and 12 will be in inoperative positions with respect to each other.

Figure 2:
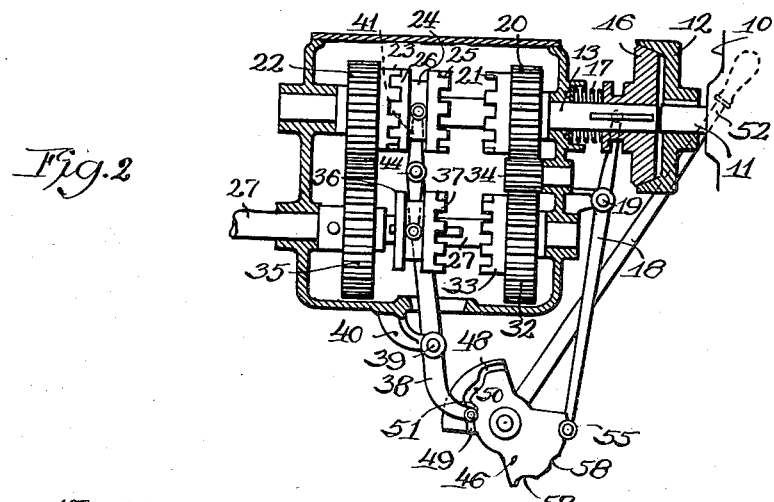
Figure 2 is a view similar to Figure 1, showing the parts in position for a forward motion.

In order to cause the shaft 29 to rotate to propel forwardly the lever 52 is shifted to the position shown in Figure 2. This will cause the roller 51 to ride into the portion 49 of the groove 47, with the result that the lever 38 will be rocked so as to move the clutch member 24 on the shaft 13, so that it will lock the gear 22 with the shaft 13. During this movement of the clutch 24 the roller 55 will roll over the portion 54 of the cam element until the recess 56 is in position to receive the roller 55. The entering of the roller 55 into the recess 56 will cause the clutch members 16 and 12 to be frictionally locked so that the motion of the engine shaft 11 will be transmitted through the friction clutch 12—16 to the shaft 13, through the clutch member 24 to the gear 22, thence to the gear 35, which is locked to the shaft 27.

Figure 3:
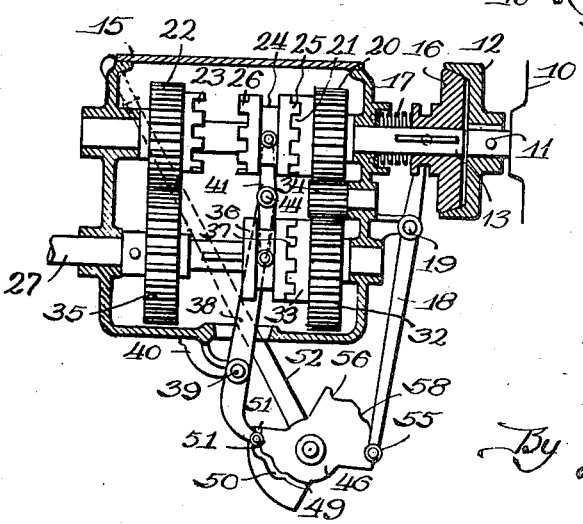
Figure 3 is a view similar to Figure 1, showing the parts in position for reverse or backward movement.

If the lever 52 is moved in the opposite direction when the parts are in the position shown in Figure 1, the parts will assume the position shown in Figure 3, which will cause the gears 20 and 32 to be respectively locked by their clutches 24 and 36 to the shafts 13 and 27, thereby causing the shaft 29 to be rotated in the opposite direction by reason of the fact that the intermediate gear 34 will cause a reverse movement of the shaft 27.

With this improved construction it will be manifest that there is provided a simple and compact combined reversing and reduction gear, all of the parts of which are controlled by a single operating lever, that is the engine friction clutch and the gear clutches will be simultaneously actuated, but the parts are so arranged that the gear clutches will be in operative engagement before the friction clutch 16—12 is rendered active.

In other words, the cam element which controls the operation of these clutches is so designed that the clutches 24 and 36 will move so as to engage the clutch faces on the respective gears 22, 20, and 32 first, after which the friction clutch 16—12 will become active.

It will be noted that the gear 32 is loosely mounted upon the shaft 27 and is connected with this shaft for rotation therewith, by means of the clutch 36. One of the objects in loosely mounting this gear 32 on the shaft is so that the gear 32 can be engaged or locked with the clutch 36 at the same time that the gear 20 is locked to the shaft 13 by the clutch 24. With this construction and arrangement the gears 20 and 32 will idle on their respective shafts when the propeller shaft is connected with the shaft 13 through the medium of the gears 22 and 35 for a forward drive.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In combination a driving shaft, a driven shaft, a forward drive connection between the shafts, clutch mechanism for controlling said connection, a reverse drive connection between said shafts, clutch mechanism for controlling the last recited connection, a lever device common to said clutch connections for controlling them, a power shaft, a clutch connection between the power shaft and said driving shaft, a lever device for controlling the last recited clutch connection, a single pivotally mounted cam element, said cam element having three distinct surfaces formed on different radii and operating upon the first recited lever device, a separate cam surface on the cam element operating upon the second recited lever device, and means for swinging the cam element about its pivot.

2. In combination, a power shaft, a driven shaft, a plurality of clutch connections between said shafts, a plurality of lever devices individual to certain of said clutch connections for controlling them, a single pivotally mounted cam device common to said lever devices for controlling them, and means for moving the cam device about its pivot, said cam device having a plurality of faces struck on different radii from the pivot of the cam, and each operating upon one of the said lever devices for causing the clutch connections controlled by the last recited lever device to assume perdetermined positions.

3. In combination, a power shaft, a driven shaft, a plurality of clutch connections between said shafts, a plurality of lever devices individual to certain of said clutch connections for controlling them, a single pivotally mounted cam device common to said lever devices for controlling them, and means for moving the cam device about its pivot, said cam device having a plurality of faces struck on different radii from the pivot of the cam and each operating upon one of the said lever devices for causing the clutch connections controlled by the last recited lever device to assume predetermined positions, the said cam device also operating to cause certain of the clutch connections to become active in advance of others of said clutch connections.

4. In combination, a power shaft, a driven shaft, a plurality of clutch connections between said shafts, a plurality of lever devices individual to certain of said clutch connections for controlling them, a single pivotally mounted cam device common to said lever devices for controlling them, and means for moving the cam device about its pivot, said cam device having a plurality of faces struck on different radii from the pivot of the cam and all operating upon one of the said lever devices for causing the clutch connections controlled by the last recited lever device to assume predetermined positions, the said cam device also having a surface operating on the other of said lever devices for rendering the clutch controlled thereby inactive, the last recited surface of the cam device being provided with a formation for maintaining the last recited clutch connection in a neutral position.

In testimony whereof, I have signed my name to this specification, on this 22nd day of January, 1927.

EMERY H. FAHRNEY.